(12) United States Patent
Richard et al.

(10) Patent No.: US 10,277,485 B1
(45) Date of Patent: Apr. 30, 2019

(54) NETWORK DEVICE TESTING USING NON-DESTRUCTIVE TECHNIQUES

(71) Applicant: Amazon Technologies, Inc., Seattle, WA (US)

(72) Inventors: Jacques Joshua Richard, Edmonds, WA (US); Paolo Gianrossi, Dublin (IE); Benoit Person, Dublin (IE); Cong Wu, Seattle, WA (US); Kevin Michael Dzierwinski, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 738 days.

(21) Appl. No.: 14/832,956

(22) Filed: Aug. 21, 2015

(51) Int. Cl.
*H04L 12/24* (2006.01)
*H04L 12/26* (2006.01)

(52) U.S. Cl.
CPC ............ *H04L 43/065* (2013.01); *H04L 41/12* (2013.01)

(58) Field of Classification Search
CPC .............................. H04L 43/065; H04L 41/12
USPC ......................................................... 709/224
See application file for complete search history.

(56) References Cited

U.S. PATENT DOCUMENTS

| | | | | |
|---|---|---|---|---|
| 6,970,919 B1* | 11/2005 | Doi | ..................... | H04L 41/0631 345/440 |
| 7,185,075 B1* | 2/2007 | Mishra | ..................... | H04L 41/00 379/207.01 |
| 8,976,704 B2* | 3/2015 | Morper | ............... | H04L 41/0853 370/254 |
| 9,525,598 B1* | 12/2016 | Gianrossi | ................ | H04L 41/12 |
| 2003/0215236 A1* | 11/2003 | Manifold | ............ | H04J 14/0226 398/79 |
| 2004/0120331 A1* | 6/2004 | Rhine | ................. | H04L 41/0823 370/408 |
| 2005/0091482 A1* | 4/2005 | Gray | ................... | H04L 41/5058 713/151 |
| 2007/0097883 A1* | 5/2007 | Liu | ......................... | H04L 41/12 370/254 |
| 2007/0189191 A1* | 8/2007 | Ades | ................... | H04L 41/0806 370/254 |
| 2008/0139219 A1* | 6/2008 | Boeiro | ................. | G01S 5/0036 455/456.2 |
| 2008/0267089 A1* | 10/2008 | Effenberger | ............ | H04L 12/66 370/254 |
| 2012/0030277 A1* | 2/2012 | Pawlowski | ....... | G06F 17/30011 709/203 |
| 2012/0215891 A1* | 8/2012 | Lessmann | ........... | H04L 41/0809 709/220 |

(Continued)

*Primary Examiner* — James E Springer
(74) *Attorney, Agent, or Firm* — Davis Wright Tremaine LLP

(57) ABSTRACT

A network topology service receives a request to validate a plurality of network connections of a network topology specified by an administrator or other network technician. The network topology service evaluates the network topology to determine the structure of the network topology, which is used to select an algorithm for organizing the network connections into one or more groups. The network topology service uses these groups to perform one or more non-destructive tests on network devices associated with the plurality of network connections in a manner that does not cause disruption to the network connections. The network topology service compiles the results of these one or more tests and provides these results to the administrator or other network technician.

20 Claims, 8 Drawing Sheets

(56) References Cited

U.S. PATENT DOCUMENTS

| | | | |
|---|---|---|---|
| 2013/0305091 A1* | 11/2013 | Stan | G06F 11/263 714/35 |
| 2014/0019804 A1* | 1/2014 | Buege | G06F 11/263 714/32 |
| 2014/0269342 A1* | 9/2014 | Baron | H04L 43/50 370/242 |
| 2014/0369199 A1* | 12/2014 | Choi | H04L 29/06156 370/235 |
| 2015/0074246 A1* | 3/2015 | Premji | H04L 41/0886 709/220 |
| 2015/0106670 A1* | 4/2015 | Gintis | H04L 43/045 714/712 |
| 2015/0295773 A1* | 10/2015 | Voigt | H04L 41/08 709/223 |

* cited by examiner

NETWORK DEVICE TESTING USING NON-DESTRUCTIVE TECHNIQUES

BACKGROUND

Many companies and other organizations operate computer networks that interconnect numerous computing systems to support their operations, such as with computing systems that are co-located (e.g., as part of a local network) or instead located in multiple distinct geographical locations (e.g., connected via one or more private or public intermediate networks). For example, data centers housing significant numbers of interconnected computing systems have become commonplace; there are private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. As the scale and scope of typical data centers has increased, the task of managing and maintaining the physical computing resources have become increasingly complicated.

BRIEF DESCRIPTION OF THE DRAWINGS

Various embodiments in accordance with the present disclosure will be described with reference to the drawings, in which.

DETAILED DESCRIPTION

Figure 1:
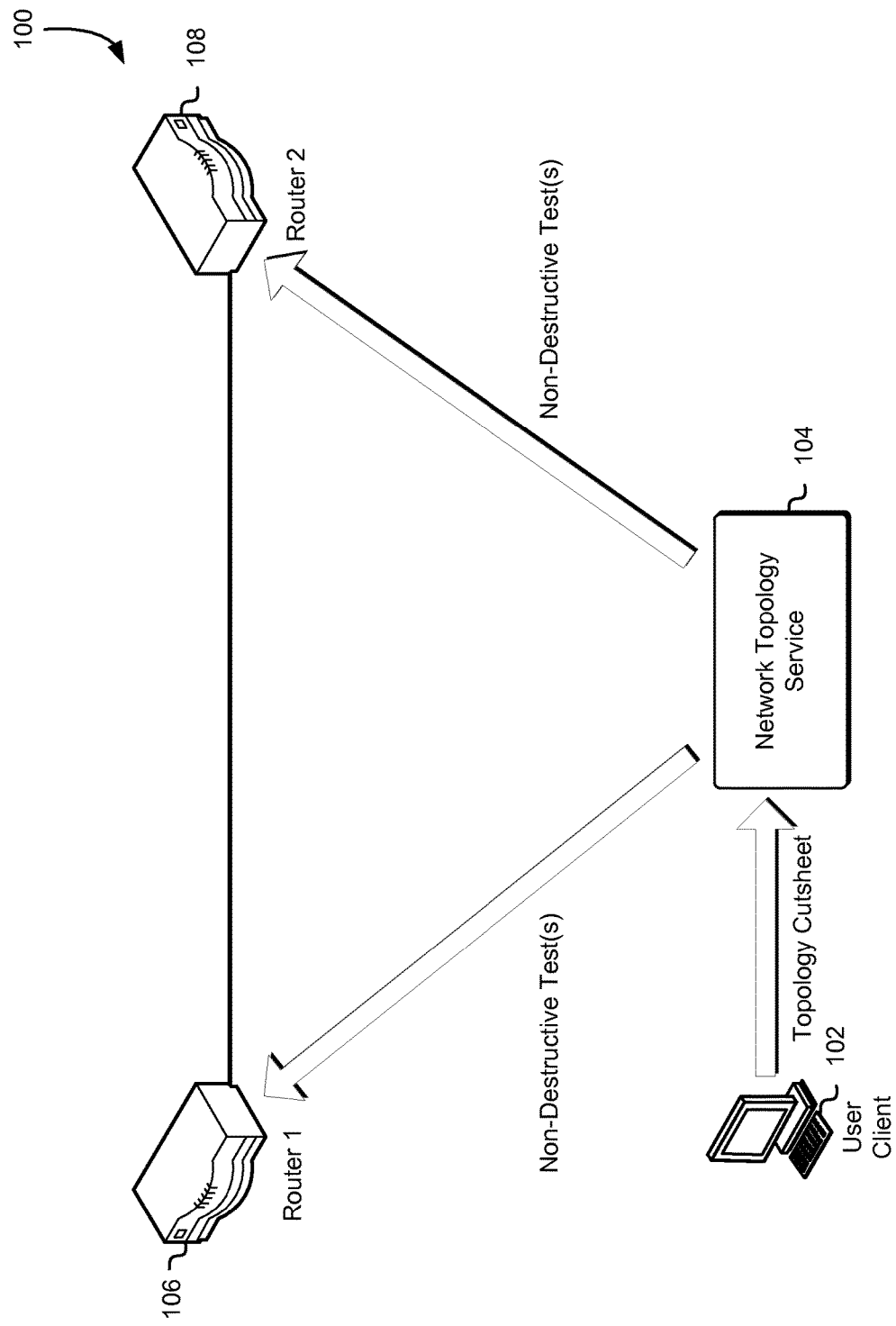
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to a framework for the non-destructive testing of various network devices and connections within a distributed network based on user-provided network topology descriptions. An administrator of a distributed network may use a user client device to access and use an interface of a network topology service to provide a cutsheet specifying a network topology for a network that includes physical connections between various networking devices (e.g., routers, network switches, servers, etc.) within the network. The network topology service may evaluate the provided cutsheet and determine the network topology that is to be tested on behalf of the administrator. For instance, the network topology service may determine, based on the provided cutsheet, that the network topology to be evaluated corresponds to a Clos network topology or other network topology that has a strong degree of symmetry and is stable (e.g., consistent across networks). If the network topology service determines that the network topology to be evaluated corresponds to a Clos network topology or other network topology that has a strong degree of symmetry, the network topology service may expect a full mesh between tiered network devices within the network. This may cause the network topology service to utilize a group coverage algorithm that creates a distinct number of groups, each specifying as many distinct network devices as possible. This algorithm may provide optimal group coverage for the case of a full mesh between tiered network devices. Alternatively, if the cutsheet specifies an arbitrary network topology, the network topology service may utilize a set cover problem algorithm to generate a distinct number of groups for the tiered network devices.

Once the network topology service has organized the network devices and their corresponding links into a number of groups, the network topology service may store these groups within a database system for asynchronous dispatching to testing clients. These testing clients may include a number of computer systems within each data region of a network where the network devices specified in the group are operating. When the testing client receives the group from the network topology service, the testing client may identify a particular link between a pair of network devices of the group and initiate testing of these network devices to determine the state of the devices and of the link itself. For instance, the testing client may perform an interface test on the network devices of a network device pair to determine whether the interfaces for these devices are operational. Additionally, the testing client may access each network device to identify the corresponding neighbor (e.g., network device connected to a port of the targeted network device) and determine whether the network devices are correctly connected to one another. In some instances, the testing client may obtain information regarding the physical connection itself, including optical light levels (e.g., for fiber-optic connections), transmission rates, receipt rates, and the like.

The testing client may transmit the results of the tests performed on the various network devices of the group to the database system, which may store these results for administrator use. The database system may organize the provided results by group and may include topology, job (e.g., analyses and tests) and operational data, as well as historical data and metrics for the various network devices and links between these devices within the network. Once the database system has been updated based on the results of the various tests and analyses performed on the various network devices and links of the groups, the database system may enable the administrator to access the reports stored within the database system through the network topology service interface. The administrator may thus utilize this information to identify any downed interfaces, erroneous links between network devices, latency issues, physical cabling issues and the like.

In this manner, an administrator of a distributed network or other network technician may develop a cutsheet for a network topology comprising a variety of network devices within the distributed network and, through the network topology service, identify any issues that may need to be addressed for this network topology without causing significant network disruption. In addition, the techniques described and suggested herein facilitate additional technical advantages. For example, because the network topology service transmits the groups and instructions to the testing client to perform interface, neighbor, and physical connection tests for the various network devices and links within the group without need to disrupt the existing connection between the network devices, the connections between the various network devices may not be subject to any downtime, as the tests are performed in a non-destructive manner. This may reduce the impact of such testing on the network as a whole.

FIG. 1 shows an illustrative example of an environment 100 in which various embodiments can be implemented. In the environment 100, a network administrator or other network technician/engineer may utilize a user client device 102 to provide a network topology cutsheet to a network topology service 104 for testing links between one or more network devices 106, 108 (e.g., routers, switches, servers, etc.) within a large, distributed network and the one or more network devices 106, 108 themselves. Through the user client device 102, a network administrator or other network technician/engineer may utilize a network topology service interface to generate the cutsheet that is to be utilized in generating one or more testing groups for the one or more network devices 106, 108. This interface may be provided by a computing resource service provider through one or more services provided by the computing resource service provider to network administrators and other network technicians and engineers. For instance, the network administrator may utilize the user client device 102 and, through a communications network (e.g., Internet), transmit a request to the one or more services to access the network topology service interface. Alternatively, the user client 102 may have installed an application provided by the computing resource service provider that includes the network topology service interface. This may enable the network administrator and other network technicians and engineers to access the interface while offline or otherwise disconnected from the computing resource service provider network.

When the administrator or other network technician utilizes the user client device 102 to access the network topology service interface, the administrator or other network technician may select the kind of network topology that it would like to validate. For instance, the administrator or other network technician may select, from the interface, a particular network topology for a set of network devices 106, 108 and the links between these network devices 106, 108 for execution of one or more non-destructive tests. In an embodiment, an administrator or other network technician can upload or otherwise provide a network topology cutsheet that may be utilized to define the network topology that is to be evaluated. The network topology cutsheet may specify identifiers for each network device 106, 108 covered by the network topology, as well as the links between these network devices 106, 108. For instance, the network topology cutsheet may specify, for each link of the network topology that is to be analyzed, an identifier for the first network device 106, an identifier of a port of the first network device 106, an identifier for the second network device 108, and an identifier of a port of the second network device 108. These identifiers, within an entry of the cutsheet, may correspond to a physical connection between a port of the first network device 106 and a port of the second network device 108.

In an embodiment, the network topology service 104 obtains the cutsheet from the user client device 102 or through the interface and divides the various cutsheet entries into one or more groups for analysis. The network topology service 104 may evaluate the various entries within the cutsheet, as well as the corresponding network device entries and port entries, to determine the nature of the network topology. For instance, if the network topology service determines, based at least in part on the provided cutsheet, that the network topology demonstrates a high degree of symmetry and is consistent across various networks, the network topology service 104 may determine that the network topology is a Clos topology or any other kind of similar network topology. For instance, if there is full mesh connectivity between a first set of network devices and a second set of network devices, the network topology service 104 may determine that this network topology is symmetric and stable. This may cause the network topology service 104 to utilize an algorithm that may organize the various links into distinct, parallel groups. These groups may be created in order to maximize efficiency, as data retrieval from each network device 106, 108 of the network topology is performed using device operations that may require usage of network device resources. Thus, the number of concurrent connections to each network device may be limited in order to improve efficiency and minimize the impact of the analyses.

In the case of an arbitrary network topology (e.g., not a Clos network topology or other highly symmetric topology), the network topology service 104 may define an algorithm that attempts to solve a non-deterministic polynomial-time hard (NP-hard) problem by applying the set cover problem to the arbitrary network topology. For instance, the network topology service 104 may rely on a sub-optimal, greedy mark and select grouping algorithm whenever a full-mesh network topology is not detected from the provided cutsheet. This algorithm may ensure that constraints on network device usage are observed (e.g., only one set of operations performed per network device per group) while trying to maximize coverage by making the locally optimal choice at each step. Using such an algorithm, the order of the links in the cutsheet may influence the distribution of the links in groups and the number of execution steps.

Once the network topology service 104 has organized the various links from the cutsheet or from the selected network topology into groups, the network topology service 104 may store these groups and links in a database system for dispatching to testing clients within one or more data regions where the network devices 106, 108 for the various links in the groups are located. The network topology service 104 may access this database system to obtain a first group of links and dispatch one or more requests to the testing clients to initiate testing of the links specified in the group. While the testing of the links is in progress, the network topology service 104 may not dispatch other requests to these testing clients that may impact the associated network devices 106, 108 in order to maintain a high level of efficiency for performance of the tests and analyses on these devices.

When the testing client obtains the one or more requests from the network topology service 104 to evaluate the links between the network devices 106, 108 of the group, the testing client may determine whether the interfaces for the network devices 106, 108 are operating normally. For instance, the interface for a network device may be online and functioning (e.g., UP/UP). Alternatively, the network device interface may be offline due to an administrative action or request (e.g., DOWN/DOWN), in which case the interface may still be activated and the network device used for testing purposes. Either of these cases may be acceptable, as the network device may be operating normally and may be configured to process network traffic through its connection with other network devices. However, if the network device interface is offline due to an issue and not through administrative action (e.g., UP/DOWN), the network device may not be utilized for testing, as the network device may require technical support in order for the interface to be activated. Thus, if a network device 106, 108 fails this interface test, the testing client may terminate the test and update a report for the group concerning the issue.

If the network devices 106, 108 for a particular link pass the interface test, the testing client may perform a neighbor test for the network devices 106, 108 to determine whether the network devices 106, 108 are meant to be connected to one another through the specified ports. For instance, the testing client may transmit a request to each network device 106, 108 to specify an identifier of the network device that is supposed to be connected to the network device 106, 108. For instance, if the network device 106 (e.g., Router 1) responds to the request by indicating that it is supposed to be connected to a network device other than network device 108 (e.g., Router 2), then the connection between the network devices 106, 108 is in error. By performing any further tests on the connection between the network devices 106, 108, the testing client may remove additional network devices from network operation during further testing, which may cause additional network disruption. To mitigate this risk, if the network devices 106, 108 fail the neighbor test, the testing client may terminate the test and update the report for the group to specify the issue. This may enable the network administrator to send a technician the colocation center for the network to correct this issue.

The testing client, if it has not identified any interface or neighbor errors for a particular link, may obtain, from network device 106 and network device 108, the number of counters for the network device interfaces. These counters may include Cyclical Redundancy Check (CRC) errors (e.g., checksum on a packet failed, requiring retransmission of a packet, etc.), hardware errors, symbol errors, and the like. These counters may be recorded by the testing client in the group report, which may be stored within the database system upon completion of the group tests. Once the testing client has obtained the number of counters from each network device 106, 108, the testing client may perform a transceiver test on both network devices 106, 108 to identify any potential issues with the physical connection between the network devices 106, 108. These results may also be recorded by the testing client within the group report. Once the testing client has completed the tests for the links of the particular group, the testing client may transmit a notification to the network topology service 104 that the tests for the group have been completed. This may cause the network topology service 104 to dispatch the next group to the testing client, which may again perform these tests for the new group and report the results of these tests. This may continue until all groups for a particular network topology have been analyzed.

The database system, which may be used to store the group reports for a network topology, may also be responsible for holding topology, job and operational data, as well as historical data and metrics for various network topologies. For instance, the database system may organize the reports based at least in part on the network topology and the network topology type (e.g., well-defined topologies such as Clos topologies or arbitrary topologies). Further, for each network topology, the database system may maintain an entry for the jobs (e.g., tests and analyses) being performed for links of the network topology under test. The database system may maintain a status for each of these jobs, as well as any reports associated with these jobs if completed successfully. For instance, through the interface, an administrator or other network technician may determine the status of any tests being performed for groups of a network topology as they are being performed. The database system may be configured to continually update the interface based at least in part on administrator input and provide status updates on tests being performed or completed by the network topology service 104. Thus, in some embodiments, the testing client is continuously transmitting state information concerning performance of the tests on the network devices 106, 108 to the network topology service 104 in order to enable the network topology service 104 to inform the administrator or other network technician of the current status of a particular network topology analysis.

Figure 2:
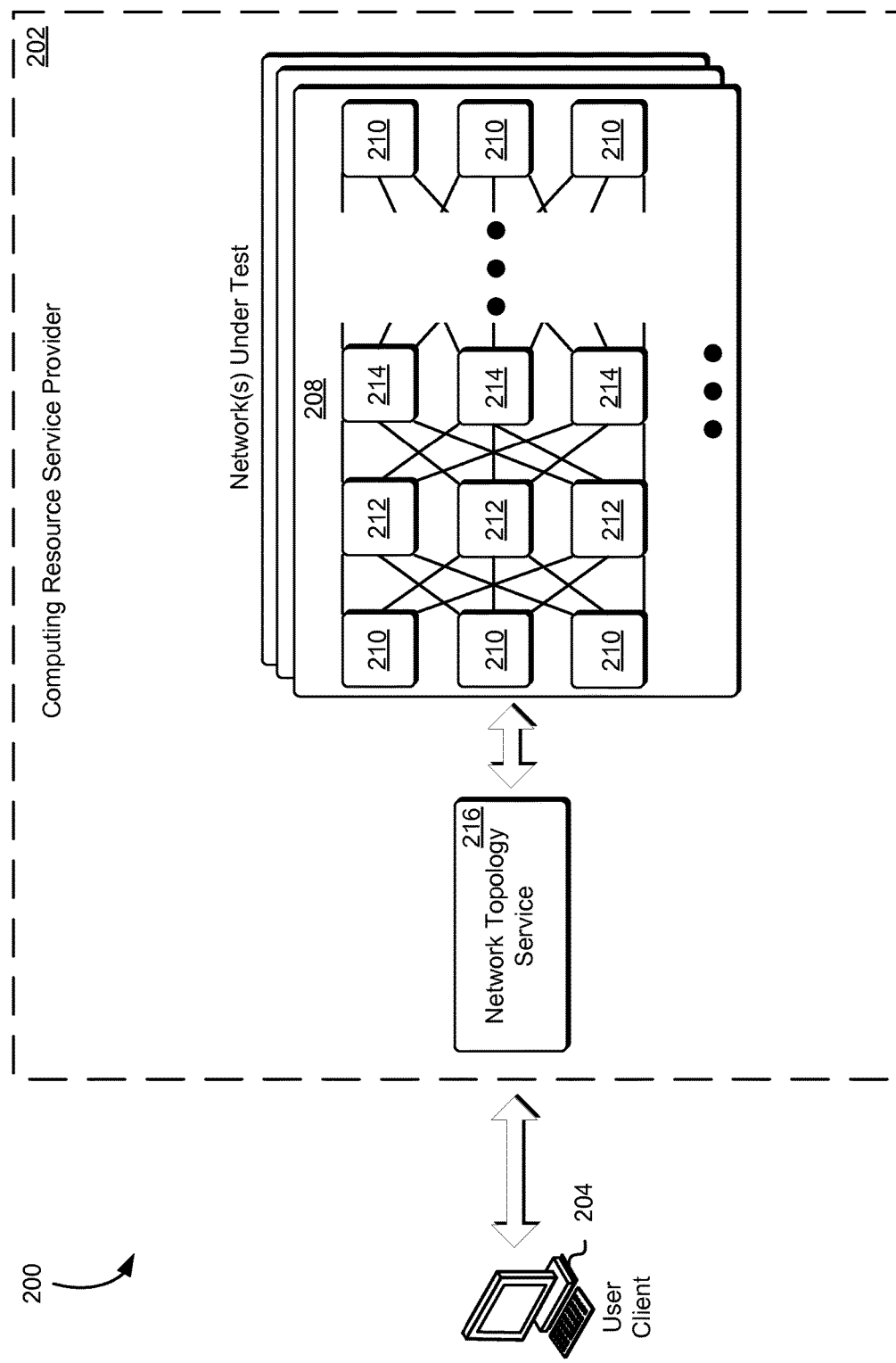
FIG. 2 shows an illustrative example of an environment in which a user client submits a request to a network topology service to perform one or more tests on network hardware within a large network in accordance with at least one embodiment.

As noted above, a network administrator or other network technician/engineer may connect a user client device to a network topology service to provide a cutsheet or otherwise specify a network topology for analysis, which may cause the network topology service to execute one or more tests for a variety of network devices and links within a distributed network. Accordingly, FIG. 2 shows an illustrative example of an environment 200 in which a user client device 204 submits a request to a network topology service 216 to perform one or more tests on network hardware within a large network in accordance with at least one embodiment. In the environment 200, a network administrator or other network technician/engineer may utilize a user client device 204 to access a network topology service 206 provided by the computing resource service provider 202 for testing various network devices 210, 212, 214 and the associated links among these various network devices 210, 212, 214 within a particular network 208. The network topology service 206 may include a user interface, such as a graphical user interface (GUI), which the administrator or other network technician/engineer may utilize to select the network topology that is to be analyzed. For instance, the network topology service 206 may maintain a database system, which may include information for network topologies of the network 208 and the links among the various network devices 210, 212, 214 of the network 208. This information for existing network topologies may be populated by the computing resource service provider 202, the network topology service 216, or an administrator/network technician responsible for maintenance and oversight of the network 208. Through the GUI, an administrator or other network technician may select an existing network topology from the database system for analysis.

In an embodiment, the network topology service 216 enables administrators and network technicians, through the GUI, to provide a network topology cutsheet specifying a custom set of links within the network 208 that are to be analyzed. For instance, through the cutsheet, an administrator may specify, for each entry in the cutsheet, an identifier for a first network device, an identifier for the port of the first network device, an identifier for a second network device, and an identifier for a port of the second network device. These identifiers may correspond to a particular physical connection (e.g., link) between the first network device and the second network device, whereby the physical connection is between the specified ports of the network devices. The network topology service 216 may evaluate the received cutsheet to determine the network topology that is to be analyzed. For instance, if the network topology presents a strong degree of symmetry and is consistently the same across various networks 208, the network topology service 216 may determine that the presented network topology is similar to a Clos network topology. The network topology service 216 may thus utilize an algorithm to group the various links in this network topology such that each group includes as many distinct network devices as possible. An example of group creation based at least in part on a symmetric network topology is described in greater detail below in connection with FIG. 4.

If the presented network topology in the cutsheet is arbitrary (e.g., little to no symmetry, unstable, etc.), the network topology service 208 may utilize a different algorithm to group the various links specified in the cutsheet. For instance, the network topology service 216 may define an algorithm that attempts to solve a non-deterministic polynomial-time hard (NP-hard) problem by applying the set cover problem to the arbitrary network topology. The network topology service 216 may rely on a sub-optimal, greedy mark and select grouping algorithm whenever a full-mesh network topology is not detected from the provided cutsheet. This algorithm may ensure that constraints on network device usage are observed (e.g., only one set of operations performed per network device per group) while trying to maximize coverage by making the locally optimal choice at each step. Using such an algorithm, the order of the links in the cutsheet may influence the distribution of the links in groups and the number of execution steps.

The network topology service 216 may comprise one or more computer systems configured to execute the aforementioned algorithms to divide a network topology, whether specified in a cutsheet or selected through the GUI, into one or more distinct groups for analysis. These distinct groups may be created in order to maximize efficiency by performing test operations in parallel as much as possible. For instance, the network 208 may include a set of constraints that may limit the number of parallel operations that may be performed by the network topology service 216. As an illustrative example, the network topology service 216 may be required to apply an exclusive lock on a network device in order to execute certain test operations. This may limit the number of concurrent connections to the number of separate network devices 210, 212, 214 that comprise the network topology. In some instances, even if this constraint is not applicable, there may still be a limit on the number of concurrent connections to a network device at any given time. Thus, the network topology service 216 may not be able to perform tests for multiple connections on a given network device at the same time. These constraints may be programmed into the algorithm in order to generate the various groups for testing.

Once the network topology service 216 has defined the various groups based at least in part on the provided network topology, the network topology service 216 may store these groups within a database system of the network topology service 216. A scheduling dispatcher sub-system of the network topology service 216 may select a group from the database system and transmit this group, as well as executable instructions, to a testing client within the network 208 to perform the required tests on the network devices 210, 212, 214 defined within the group, as well the network connections among these network devices 210, 212, 214. The testing client may be a computer system or server within the network 208 that includes one or more programming libraries, which may be include various command line operations that may be performed as part of a test or analysis of network devices 210, 212, 214. Thus, when the testing client examines a command provided by the scheduling dispatcher sub-system, the testing client may identify the appropriate programming library and utilize the various command line operations specified within the library to perform the desired test or analysis.

The network under test 208 may be a dense, multi-path, multi-layer internal interconnected network 208 that includes a plurality of different physical paths between computing devices connected and/or included in the network under test 208. The physical paths may be cables, such as fiber optic cables, or other connections between interfaces of the computing devices connected and/or included in the network under test 208. As illustrated in FIG. 2, the network under tests 208 is shown as comprising a number of distinct layers, including outer layers comprising interconnect nodes 210, and inner layers comprising a different class of interconnect nodes 212 and 214. The outer layer nodes 210 may differ from the inner layer nodes 212 and 214, such as the physical arrangement of the nodes, the number of nodes per rack, the number of distinct in and/or out interfaces at each node, the performance capabilities of the physical links leading into and/or out of the nodes, and so on.

The nodes 210, 212, and 214 may comprise a variety of different computing devices including routers, switches, hubs, network bridges, or other computing devices suitable for using in a network 208. The nodes 210, 212, and 214 may contain one or more interfaces, such as ports, which may be connected to an interface of another node. In various embodiments, the interfaces of the nodes 210, 212, and 214 are connected in a predefined pattern or topology determined based at least in part on networking requirements. The topology information may be maintained in an authoritative data store maintained through a network topology service 216 and accessible to the testing client through the scheduling dispatcher sub-system. The topology information may be used by the network engineers to connect cables between the interfaces of the nodes 210, 212, and 214 indicated in the topology information. Furthermore, the testing client may use the topology information to validate the test results obtained from the nodes 210, 212, and 214.

In order to determine whether any tests or analyses may be performed, the testing client may determine whether the interfaces for the nodes 210, 212 are activated or may be activated to support transmissions over the connection between the nodes 210, 212. If the nodes 210, 212 successfully pass the interface tests (e.g., the interfaces are active), the testing client may perform a neighbor test to determine whether the nodes 210, 212 are properly connected to one another through the connection, as specified in the provided group information from the scheduling dispatcher sub-system of the network topology service 216. For example, the testing client may obtain information from the group indicating that node 210 should be connected to node 212 on port 1. The testing client may then transmit a request to node 210 to provide neighbor information to the testing client for analysis. For instance, node 210, through use of the Link Layer Discovery Protocol (LLDP), may advertise its identity, capabilities, and neighbors within the network 208. Using the example above, if node 210 indicates that it is connected to node 212 through port 3, the testing client may update a group report to indicate that the node 210 is connected to node 212 through an incorrect port. This information may enable the network administrator to alter the network under test 208 and connect node 210 to node 212 through port 3.

Once the testing client has completed the interface test and the neighbor test, the testing client may identify, from the interfaces of the nodes 210, 212, any counters that may have been generated due to connectivity errors, hardware errors, or any other errors in the interfaces. These counters may be included in the updated report for the group. Further, the database system may utilize historical data for the nodes 210, 212 to identify any changes in these counters over time. The testing client may further perform one or more tests and analyses to evaluate the physical connection between nodes 210, 212. For instance, the testing client may perform a transceiver check to determine the signal strength of a light signal transmitted form each node and the signal strength of a light signal being received by each node. If the signal strength is below a particular threshold, the testing client may record this failure within the report for the group.

Upon completion of the tests specified by the network topology service 216, the testing client may complete the report for the group, which may include the results of each test and analysis performed on the network devices 210, 212, 214 of the group. This report may be provided to the database system immediately. This may enable various users to access the report as needed through the GUI. After completion of the tests for the group, the network topology service 216, through the scheduling dispatcher sub-system may transmit a new group and executable instructions to the testing client to perform tests on links of this new group. This may enable the testing client to automatically test each connection within the network 208 as specified in the cutsheet or in the selected network topology and identify any issues present within the network 208 for nodes 210, 212, and 214.

Figure 3:
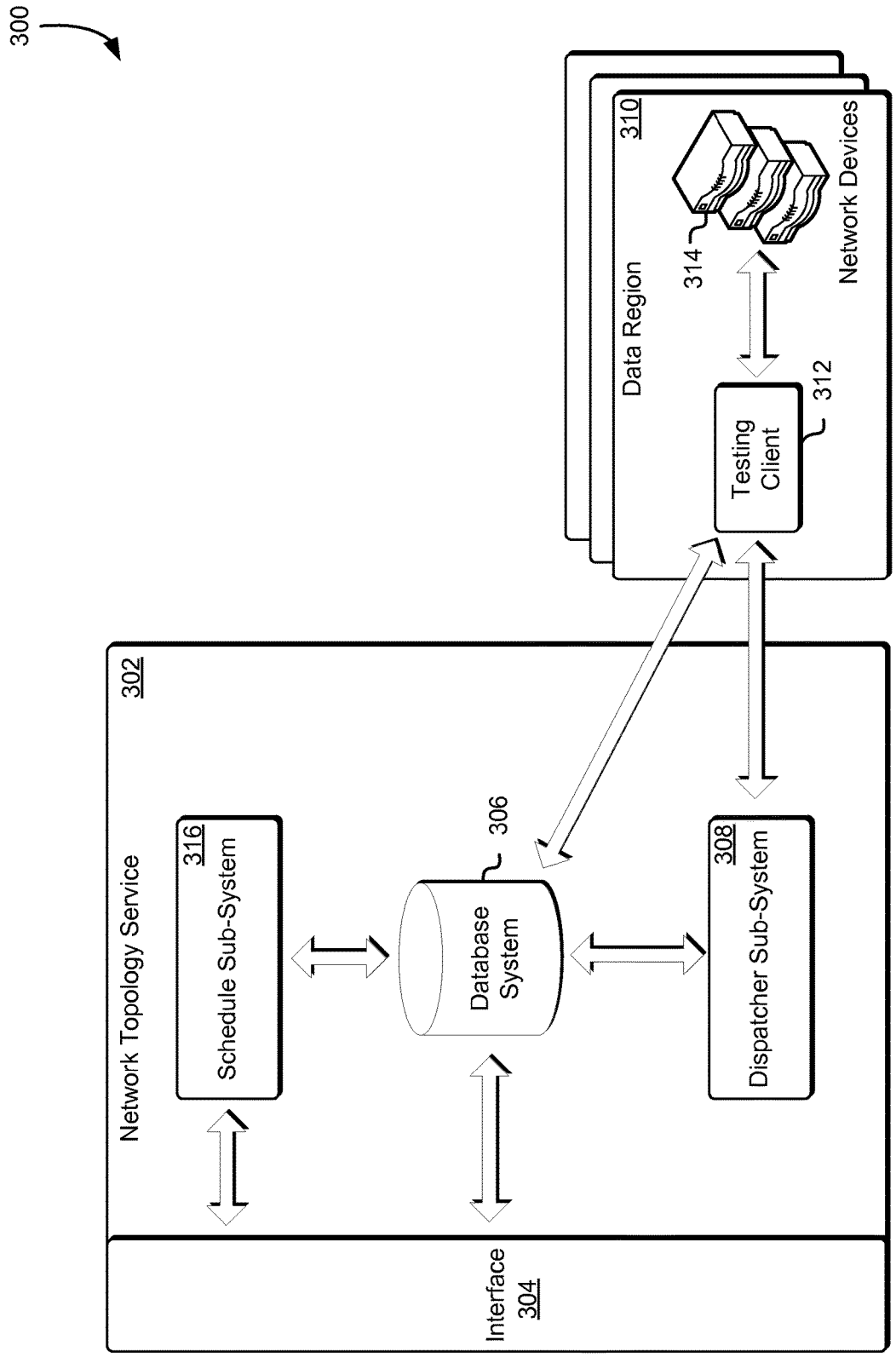
FIG. 3 shows an illustrative example of an environment in which a network topology service interacts with testing clients in various data regions to perform one or more tests on network hardware within the various data regions in accordance with at least one embodiment.

As noted above, the network topology service may enable administrators and other network technicians to define or select a network topology for testing. The network topology service may utilize the defined or selected network topology to generate distinct groups for testing the network devices specified in the network topology and the links among these network devices. The network topology service may comprise a plurality of components that may be configured to enable the administrators and other network technicians to access the service, but to also define the network topology and obtain information regarding any test results for the network topology as the results are being generated. Further, these components may enable the administrator or other network technician to evaluate test information for the network topology over time. Accordingly, FIG. 3 shows an illustrative example of an environment 300 in which components of a network topology service 302 interact with testing clients 312 in various data regions 310 to perform one or more tests on network hardware within the various data regions 310 in accordance with at least one embodiment.

In the environment 300, the network topology service 302 may include an interface 304, which may be accessible to an administrator of a network or other network technicians for verification and validation of a particular network topology. From the interface 304, an administrator or network technician may select the network topology that it wants to validate. For instance, the network topology service 302 may specify, through the interface 304, identifiers for different resources within the network, which may include various network devices that form a distinct network topology. An administrator or other network technician may utilize the interface 304 to select a resource within the network from those specified by the network topology service 302. The network topology service 302 may utilize this selection to identify the corresponding network topology for the particular resource.

In an embodiment, the network topology service 302, through the interface 304, enables administrators and network technicians to provide a network topology cutsheet, which may specify a desired network topology that is to be analyzed. For instance, the network topology cutsheet may specify identifiers for each network device that is a part of the network topology, as well as the links among these network devices. For instance, the network topology cutsheet may specify, for each link of the network topology that is to be analyzed, an identifier for the first network device, an identifier of a port of the first network device, an identifier for the second network device, and an identifier of a port of the second network device. These identifiers, within an entry of the cutsheet, may correspond to a physical connection between a port of the first network device and a port of the second network device.

Once the administrator or other network technician has selected or otherwise defined the network topology that is to be analyzed, the interface 304 may provide the network topology to a schedule sub-system 316. The schedule sub-system 316 may include one or more computer systems, or modules of computer systems of the network topology service 302, configured to parse the network topology input (e.g., network topology cutsheet, network topology definition file, etc.) and define the network topology groups for analysis. The schedule sub-system 316 may create the resulting groups by applying the appropriate grouping algorithm based at least in part on the specified network topology. For instance, the schedule sub-system 316 may evaluate the various entries within the cutsheet, as well as the corresponding network device entries and port entries, to determine the nature of the network topology. For example, if there is full mesh connectivity between a first set of network devices and a second set of network devices, the schedule sub-system 316 may determine that this network topology is symmetric and stable. This may cause the schedule sub-system 316 to utilize an algorithm that may organize the various links into distinct, parallel groups. The number of concurrent connections to each network device may be limited in order to improve efficiency and minimize the impact of the analyses.

In the case of an arbitrary network topology (e.g., non-Clos network topologies, asymmetrical topologies, etc.), the schedule sub-system 316 may utilize an NP-hard algorithm that applies the set cover problem to the arbitrary network topology. For instance, the schedule sub-system 316 may rely on a sub-optimal, greedy mark and select grouping algorithm whenever a full-mesh network topology is not detected from the provided cutsheet. This algorithm may ensure that constraints on network device usage are observed (e.g., only one set of operations performed per network device per group) while trying to maximize coverage by making the locally optimal choice at each step. Using such an algorithm, the order of the links in the cutsheet may influence the distribution of the links in groups and the number of execution steps.

Once the schedule sub-system 316 has defined the groups for the network topology that is to be analyzed, the schedule sub-system 316 may store these groups within the database system 306 for dispatching to the various data regions 310 comprising the network devices 314 and links specified within these groups. The database system 306 may comprise one or more computer systems, as well as a persistent datastore, for storing various data about any tests and analyses performed on network devices 314 and the links among these network devices 314. The database system 306 may further be responsible for storing network topology data (e.g., known network topologies, groups generated by the schedule sub-system 316, etc.), test data, operational data for the network devices 314 and associated links, historical data for the network devices 314 and associated links, and metrics data for the network topology service 302.

The dispatcher sub-system 308 may comprise one or more computer systems, or modules of the network topology service 302 computer systems, configured to obtain groups from the database system 306 and dispatch tasks to the appropriate testing clients 312 in each data region 310 where network devices 314 specified within these groups reside. The dispatcher sub-system 308 may be responsible for optimizing the scheduling of tests and analyses in order to maximize parallelism while avoiding conflicting connections to the network devices 314. For instance, the dispatcher sub-system 308 may be subject to a constraint, whereby two independent tasks are to be executed in strict weak order of arrival. Further, for each task, the dispatcher sub-system 308 may enforce a constraint whereby links may be checked in parallel as long as there are no concurrent connections on the same network device 314.

Once the dispatcher sub-system 308 has determined, based at least in part on an obtained group from the database system 306, the tasks that are to be performed for network devices 314 of the group, the dispatcher sub-system 308 may transmit these tasks to the appropriate testing clients 312 within each data region 310 that includes at least one network device 314 of the group. The testing client 312 may include a server, computer system, module of a computer system or other computing device that may be configured to interact with one or more network devices 314 within a data region 310 to perform various tests and analyses based at least in part on the tasks provided by the dispatcher sub-system 308. The testing client 312 may determine whether any tests or analyses may be performed by evaluating the interfaces for the network devices 314. The testing client 312 may evaluate these interfaces to determine whether these interfaces are activated or may be activated to support transmissions over connections among the network devices 314 specified by the dispatcher sub-system 308. If the network devices 314 successfully pass the interface tests, the testing client 312 may perform a neighbor test to determine whether network devices 314 for a particular link are properly connected to one another through the link, as specified in the provided group information from the dispatcher sub-system 308. The testing client 312 may transmit a request to the network devices 314 to provide neighbor information to the testing client 312 for analysis. For instance, through use of LLDP, the network devices 314 may advertise their identity, capabilities, and neighbors within the network.

Once the testing client 312 has completed the interface test and the neighbor test, the testing client 312 may identify, from the interfaces of the network devices 314, any counters that may have been generated due to connectivity errors, hardware errors, or any other errors in the interfaces. These counters may be included in the updated report for the group. Further, the database system 306 may utilize historical data for the network devices 314 to identify any changes in these counters over time. The testing client 312 may further perform one or more tests and analyses to evaluate the physical connection (e.g., links specified in the group) among the network devices 314. For instance, the testing client 312 may perform a transceiver check to determine the signal strength of a light signal transmitted from each network device 314 and the signal strength of a light signal being received by each network device 314. If the signal strength is below a particular threshold, the testing client 312 may record this failure within the report for the group.

During execution of a network topology analysis, the database system 306 may be updated by the dispatcher sub-system 308 and the testing client 312 with results of tests and analyses of the network devices 314 and their associated links. The database system 306 may utilize this information to identify the status of the network topology analysis. The database system 306 may provide this status update to the interface 304, which may display this update for the benefit of the administrator or other network technician utilizing the interface 304 to evaluate the health of the network topology. Through the interface 304, the administrator or other network technician may request results for a network topology, a group of the network topology as defined by the schedule sub-system 316, specific links of the network topology, and specific network devices 314 of the network topology. The database system 306 may evaluate information obtained from the dispatcher sub-system 308 and the testing clients 312 to determine the status for the requested topology, group, link, and/or network device 314.

Figure 4:
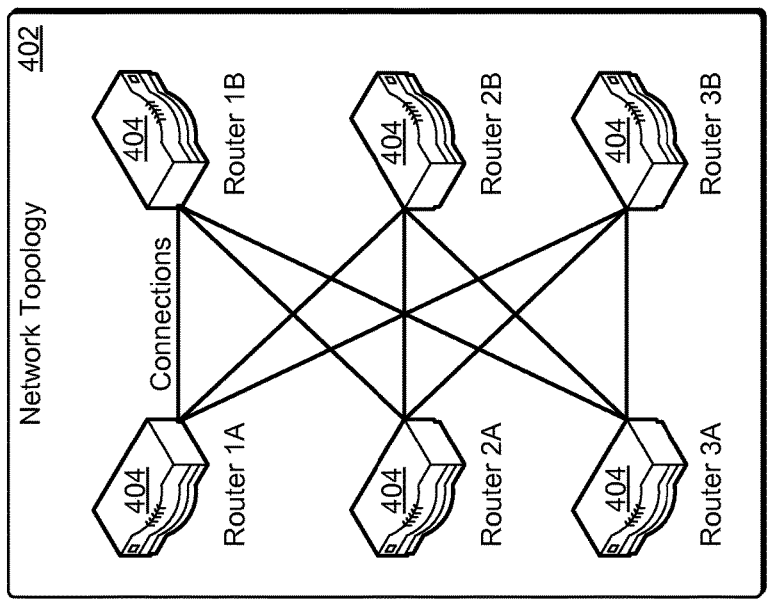
FIG. 4 shows an illustrative example of an environment in which a network topology connection algorithm is utilized to organize links between various network devices into distinct groups for non-destructive testing in accordance with at least one embodiment.

As noted above, the network topology service, through a schedule sub-system, may parse network topology input in order to define one or more groups through use of one or more grouping algorithms. These groups may be created in order to satisfy certain constraints, particularly any constraints restricting the number of concurrent connections to a network device. Accordingly, FIG. 4 shows an illustrative example of an environment 400 in which a network topology algorithm is utilized to organize links between various network devices 404 into distinct groups 408 for non-destructive testing in accordance with at least one embodiment.

In the environment 400, an administrator or other network technician may define a network topology 402 for various connections, or links, with the network. For instance, the administrator or other network technician may specify, within a cutsheet, a variety of network devices 404, the connections among these network devices 404, and the associated ports of these network devices 404 that are utilized for each connection specified in the network topology 402. Alternatively, if the administrator or other network technician selects, through the network topology service interface, an existing network topology 402, the network topology service may obtain information for the network topology 402 from the database system and determine the configuration of the network devices 404 within this network topology 402.

The network topology service may evaluate the network topology 402, including the links, corresponding network devices 404 and ports for these network devices 404, to determine the nature of the network topology 402. For instance, if the network topology service determines, based at least in part on the network topology 402, that the network topology 402 demonstrates a high degree of symmetry, the network topology service may determine that the network topology is a Clos topology or any other kind of similar network topology 402. For instance, if there is full mesh connectivity between a first set of network devices and a second set of network devices, as illustrated in FIG. 4, the network topology service may determine that this network topology 402 is symmetric and stable. This may cause the network topology service to utilize an algorithm that may organize the various links into distinct, parallel groups 408. These groups may be created in order to maximize efficiency, as data retrieval from each network device 404 of the network topology is performed using device operations that may require usage of network device resources. Thus, the number of concurrent connections to each network device may be limited in order to improve efficiency and minimize the impact of the analyses. Further, this limit may be imposed as a result of a constraint to minimize the number of concurrent connections to a network device 404 at any given time. For instance, as illustrated in FIG. 4, each group 408 within the test plan 406 refers to each network device 404 only once in order to prevent concurrent connections within a network device 404 for the group.

In the case of an arbitrary network topology (e.g., non-Clos network topologies or other asymmetric topologies), the network topology service may utilize an algorithm that attempts to solve an NP-hard problem by applying the set cover problem to the arbitrary network topology. For instance, the network topology service may rely on a sub-optimal, greedy mark and select grouping algorithm whenever a full-mesh network topology is not detected from the provided cutsheet. This algorithm may ensure that constraints on network device usage are observed (e.g., only one set of operations performed per network device per group) while trying to maximize coverage by making the locally optimal choice at each step. Using such an algorithm, the order of the links in the cutsheet may influence the distribution of the links in groups and the number of execution steps.

The test plan 406 including the one or more groups 408 may be stored within the database system for dispatching to the testing clients within the network. Based at least in part on the generated groups 408 for the network topology 402, the network topology service may schedule the tests and analyses for the connections in a group 408. As noted above, the network topology service may be subject to a constraint, whereby two independent tasks are to be executed in strict weak order of arrival. Further, for each task, the network topology service may enforce a constraint whereby links may be checked in parallel as long as there are no concurrent connections on the same network device. Once the network topology service has determined, based at least in part on the group 408, the network topology service may transmit the tasks to the appropriate testing clients within each data region that includes at least one network device of the group 408. While a group 408 within the test plan 406 is under test, no other group 408 may be analyzed. This may prevent violation of the constraint on concurrent connections on a network device 404 at any given time for testing.

Figure 5:
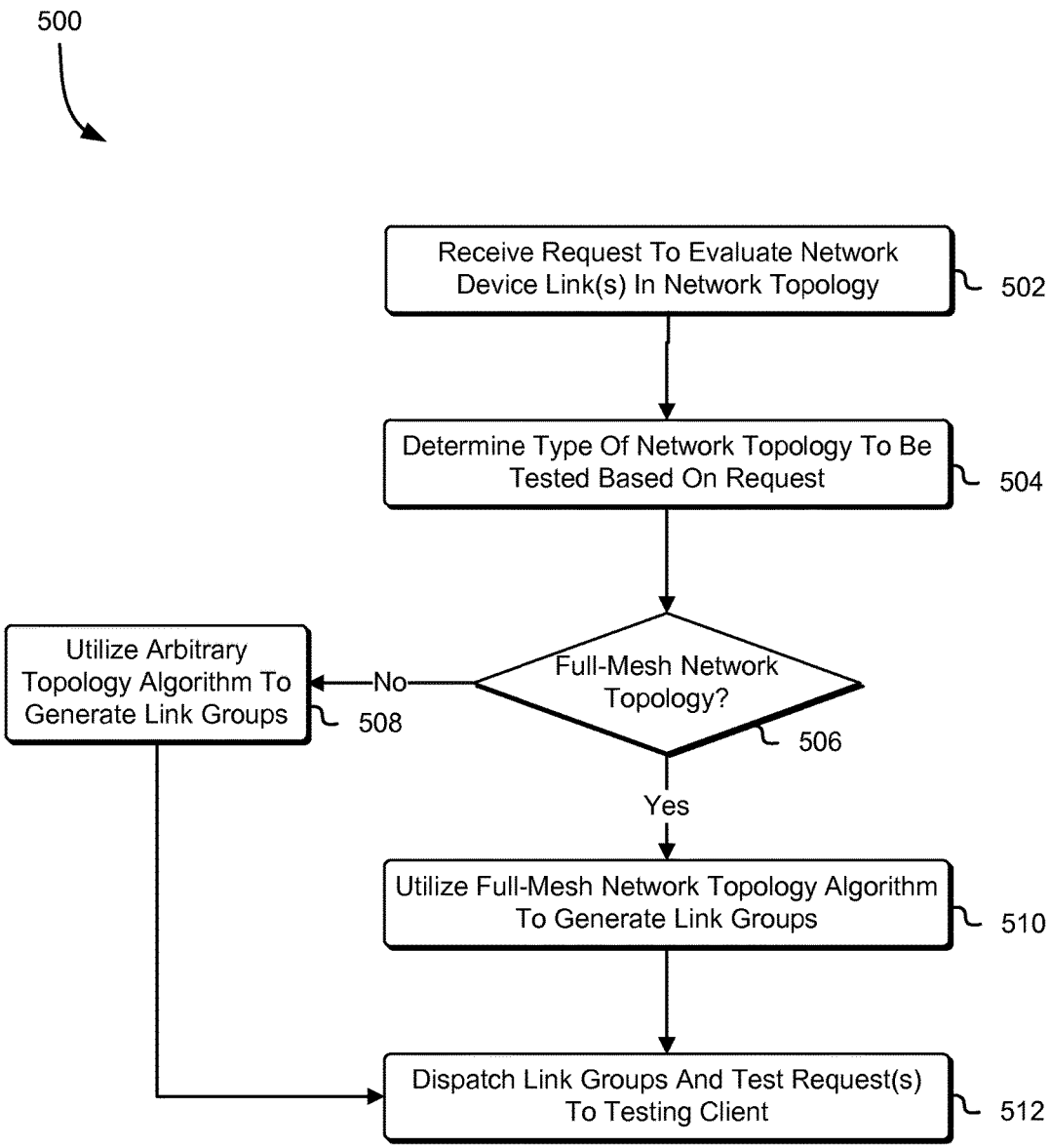
FIG. 5 shows an illustrative example of a process for generating network device link groups based at least in part on a provided network topology cutsheet for evaluation of network device links in accordance with at least one embodiment.

As noted above, the network topology service may receive a request from an administrator or other network technician to evaluate connections and devices that define a network topology in a non-destructive manner (e.g., the connections and devices are not removed from service to perform the tests). Non-destructive tests, in some examples, are evaluations performed on network devices within a network topology in a manner that does not alter the current network state. Thus, for non-destructive tests, the connections and devices within the network are not modified for purposes of the evaluations, using the current configuration of the devices and connections to perform the evaluations. The request may include a network topology cutsheet specifying the network topology that may be utilized to generate groups of connections for testing. The network topology service may provide these groups, along with the tasks (e.g., tests and analyses) to be performed on the associated network devices to corresponding testing clients in the data regions where the network devices are located. Accordingly, FIG. 5 shows an illustrative example of a process 500 for generating network device link groups based at least in part on a provided network topology cutsheet for evaluation of network device links in accordance with at least one embodiment. The process 500 may be performed by the aforementioned network topology service, through a schedule sub-system of the service, which may be configured to generate the various groups from the provided network topology.

The network topology service may include an interface, which may be accessible to an administrator of a network or other network technicians for verification and validation of a particular network topology. From the interface, an administrator or network technician may select the network topology that it wants to validate. For instance, the network topology service may specify, through the interface, identifiers for different resources within the network, which may include various network devices that form a distinct network topology. An administrator or other network technician may utilize the interface to select a resource within the network from those specified by the network topology service. The network topology service may utilize this selection to identify the corresponding network topology for the particular resource. Alternatively, through the interface, a customer may provide a network topology cutsheet, which may specify a particular network topology that is to be analyzed. When the administrator or other network technician selects or otherwise specifies the network topology for analysis, the interface may generate a request to evaluate the links within this specified network topology. Thus, the network topology service may receive 502 a request to evaluate the links within this network topology, as well as the associated network devices.

Once the network topology service has obtained the request from the administrator or other network technician to evaluate a particular network topology, the network topology service may evaluate the network topology to determine 504 the type of network topology that is to be tested. For instance, the network topology service may examine each link entry within the provided cutsheet to identify the various network devices and corresponding ports of these network devices utilized for each connection. This may enable the network topology service to identify the relationship among the various network devices and the associated links between these devices. Based at least in part on this evaluation, the network topology service may determine 506 whether the network topology corresponds to a Clos network topology or other highly symmetric network topology. For instance, for highly symmetric network topologies, the network topology service may expect a full mesh among the various network devices in the network topology. An observation of such a full mesh may serve as an indicator that the network topology is highly symmetric or similar to a Clos network topology. Otherwise, the network topology service may determine that the provided network topology is not highly symmetric and, thus, arbitrary in nature.

If the network topology service determines that the network topology is not highly symmetric, such that the network topology is arbitrary in nature, the network topology service may utilize 508 an arbitrary topology algorithm to generate link groups for the links in the network topology. As noted above, the network topology service may utilize an algorithm that attempts to solve an NP-hard problem by applying the set cover problem to the arbitrary network topology. For instance, the network topology service may rely on a sub-optimal, greedy mark and select grouping algorithm whenever a full-mesh network topology is not detected from the provided cutsheet or selected network topology. This algorithm may ensure that the constraints described above for the network devices are enforced.

Alternatively, if the network topology service determines that the network topology is highly symmetric (e.g., Clos network topology, etc.), the network topology service may utilize 510 the full-mesh network topology algorithm to generate the one or more link groups for the links defined in the network topology. This algorithm may cause the network topology service to organize the various links into distinct, parallel groups. These groups may be created in order to maximize efficiency, as data retrieval from each network device of the network topology is performed using device operations that may require usage of network device resources. Thus, the number of concurrent connections to each network device may be limited in order to improve efficiency and minimize the impact of the analyses. Further, this limit may be imposed as a result of a constraint to minimize the number of concurrent connections to a network device at any given time.

Once the network topology service has applied the appropriate algorithm to define the one or more network topology groups for the provided network topology, the network topology service may persistently store these groups in a database system to enable dispatch 512 of these network topology groups to one or more testing clients within each data region where the network devices specified in these groups are located. For instance, from the database system, the network topology service may select a network topology group and transmit this group, as well as executable instructions for performing the tests and analyses required for analysis of the network topology, to these one or more testing clients. This may cause the testing clients to evaluate the links specified within the group and return results that may be stored within the database system and provided to the administrator or other network technician through the interface.

Figure 6:
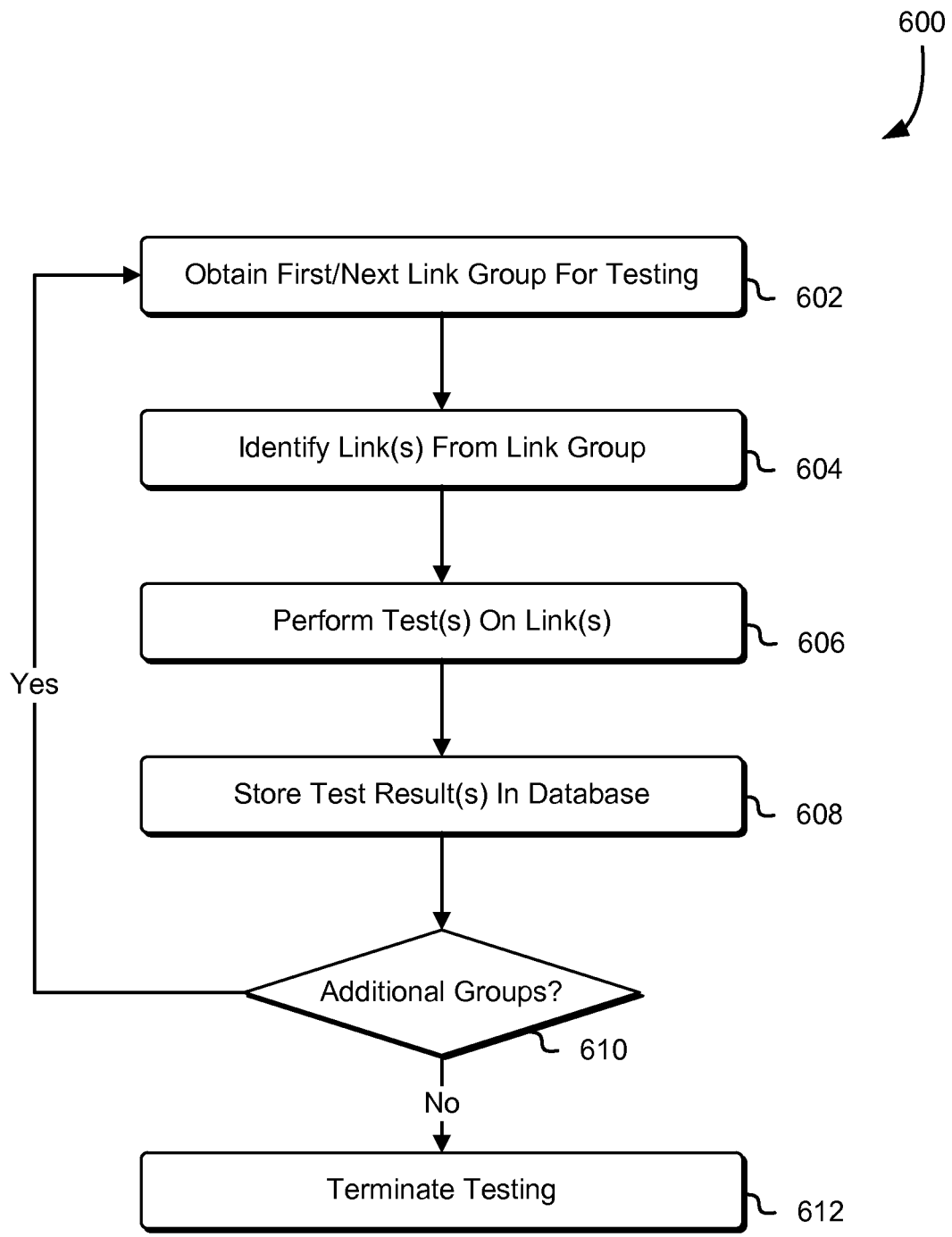
FIG. 6 shows an illustrative example of a process for performing one or more non-destructive tests on network device links and associated network devices within a group in accordance with at least one embodiment.

As noted above, a testing client within a data region may receive executable instructions to perform one or more tests on a number of network devices associated with links described within a network topology. The testing client may receive, from the network topology service, a group that may specify the various links and associated network devices that are to be tested. The testing client may evaluate these links and associate network devices and provide the results of these tests to a database system for storage and use by administrators or other network technicians. Accordingly, FIG. 6 shows an illustrative example of a process 600 for performing one or more non-destructive tests on network device links and associated network devices within a group in accordance with at least one embodiment. The process 600 may be performed by the aforementioned testing client, which may receive the executable instructions from the network topology service, as well as identifiers for links, associated network devices, and ports of the associated network devices for a group generated through use of an algorithm as described above.

The network topology service may be configured to obtain a group from the database system and dispatch executable instructions to a testing client within each data region to perform one or more network validation tests on the links and associated network devices within the data region. This group may specify a series of links, associated network devices, and ports of the associated network devices that are used for each link. Thus, the testing client may obtain 602 a first link group from the network topology service for testing of the network devices and the target ports of these devices in order to evaluate the links among these devices. As noted above, the group may specify each link that is to be analyzed, including identifiers for the network devices and associated ports for each link. The testing client may utilize these identifiers within the group to identify 604 the links that are to be analyzed and tested.

Once the testing client has identified the links, associated network devices and ports for these network devices, the testing client may perform 606 one or more tests on the specified links of the group. For instance, the testing client may determine whether any tests or analyses may be performed on the network devices by evaluating the interfaces for the network devices. The testing client may evaluate these interfaces to determine whether these interfaces are activated or may be activated to support transmissions over connections among the network devices specified in the group. The testing client may also perform a neighbor test to determine whether network devices for a particular link are properly connected to one another through the link, as specified in the provided group information from the network topology service. Once the testing client has completed the interface test and the neighbor test, the testing client may identify, from the interfaces of the network devices, any counters that may have been generated due to connectivity errors, hardware errors, or any other errors in the interfaces. The testing client may perform transceiver checks for the network devices to determine the signal strength of a light signal transmitted from each network device and the signal strength of a light signal being received by each network device.

The testing client may compile the results of these tests into a report for the group, which the testing client may store 608 within a database of the database system of the network topology service. The testing client may further transmit a notification to the network topology service to indicate completion of the analysis of the links in the group. This may cause the network topology service to either transmit a new group for analysis or indicate that no further analyses are required. Based at least in part on the communication from the network topology service, the testing client may determine 610 whether there are additional groups that require testing to fulfill a network topology testing job. If the testing client determines that there are additional groups for testing, the testing client may obtain 602 the next group from the network topology service and execute the various tests described above. If the testing client determines that there are no additional groups for testing, the testing client may terminate 612 testing until it receives new groups and requests from the network topology service.

Figure 7:
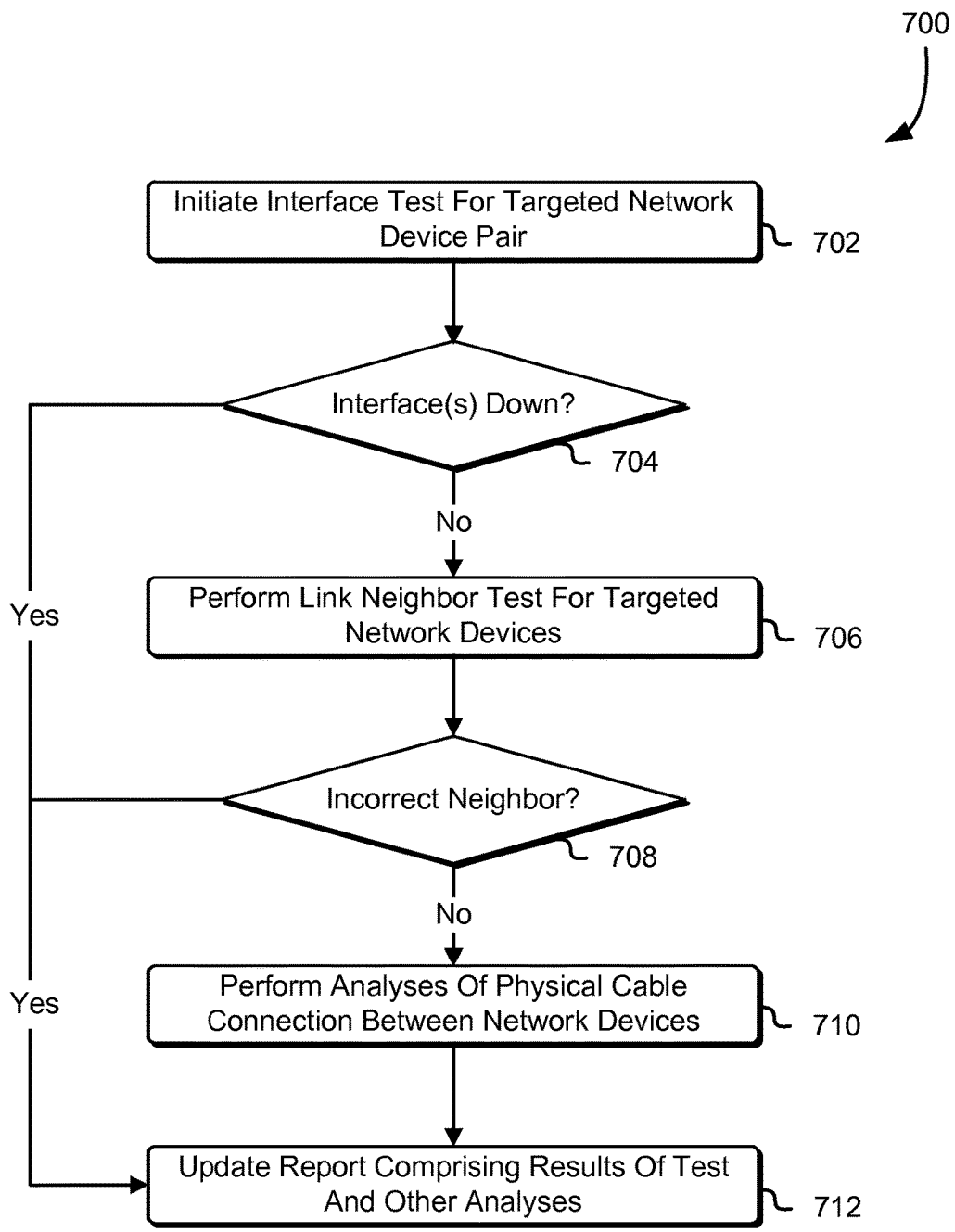
FIG. 7 shows an illustrative example of a process for performing one or more non-destructive tests on network devices of a network device link in accordance with at least one embodiment.

As noted above, a testing client within a data region may interact with one or more network devices within a data region to perform non-destructive tests of a link among network devices in the data region. For instance, the testing client may transmit requests to a network device to obtain interface information, neighbor information, cabling information, and the like that may be used to determine the health of a particular link emanating from the network device without need to disrupt the connection between the targeted network device and other network devices in the data region or in other data regions. Accordingly, FIG. 7 shows an illustrative example of a process 700 for performing one or more non-destructive tests on network devices of a network device link in accordance with at least one embodiment. The process 700 may be performed by the aforementioned testing client within a data region where network devices specified in the group are located.

Upon identifying the network devices and links within a group, the testing client may initiate 702 an interface test for the targeted network devices of a network device pair. In order to perform the interface test, the testing client may transmit a request to each network device currently being tested to obtain the status of the interfaces used for the connection between these network devices. If any interfaces are offline due to an issue with an interface of either network device, the affected network device may report, to the testing client, an interface status test failure. However, if an interface is offline due to an administrative request or due to a maintenance task being performed by a network technician, this may not be considered a failure for the purpose of the interface status test and the network device may not return an interface status test failure.

Through the interface test, the testing client may determine 704 whether any of the interfaces being tested are currently down (e.g., offline). If any of the interfaces of the network devices are offline, the testing client may transmit a request to the affected network devices to activate these offline interfaces for testing. The testing client may wait an allotted period of time before transmitting a request to determine whether the interfaces have been activated or not. If the interfaces have been activated or no interfaces were offline prior to initiation of test of the network devices of the network device pair, the testing client may perform 706 a network link neighbor test for the targeted network devices of the network device pair. However, if any interfaces of the network devices remain offline, the testing client may determine that further testing would be futile as no information may be garnered through the connection between the devices of the network device pair. Thus, if the interfaces cannot be activated, thus failing the interface test, the testing client may update 712 the group report for the group to indicate that this particular network device pair has failed the interface test portion of the test plan.

If the network devices for a particular link pass the interface test, the testing client may perform 706 a neighbor test for the network devices to determine 708 whether the network devices are not connected to the correct neighbor device through the specified ports. For instance, the testing client may transmit a request to each network device of the network device pair to specify an identifier of the network device that is supposed to be connected to the network device. For instance, if a network device responds to the request by indicating that it is supposed to be connected to a network device other than the other network device of the network device pair, then the connection between the network devices is in error. By performing any further tests on the connection between the network devices, the testing client may remove additional network devices from network operation during further testing, which may cause additional network disruption. To mitigate this risk, if the network devices fail the neighbor test, the testing client may terminate the test and update 712 the report for the group to specify the issue. This may enable the network administrator to send a technician the colocation center for the network to correct this issue.

Once the testing client has completed the interface test and the neighbor test, the testing client may identify, from the interfaces of the network devices, any counters that may have been generated due to connectivity errors, hardware errors, or any other errors in the interfaces. These counters may be included in the updated report for the group. Further, the database system may utilize historical data for the network devices to identify any changes in these counters over time. The testing client may further perform 710 one or more tests and analyses to evaluate the physical connection between the network devices of the pair. For instance, the testing client may perform a transceiver check to determine the signal strength of a light signal transmitted form each network device and the signal strength of a light signal being received by each network device. If the signal strength is below a particular threshold, the testing client may update 712 the report to indicate this failure within the report for the group.

Upon completion of the tests specified by the network topology service, the testing client may update 712 the report for the group, which may include the results of each test and analysis performed on the network devices of the group. This report may be provided to the database system upon completion. This may enable various users to access the report as needed through the GUI. After completion of the tests for the group, the network topology service, through the scheduling dispatcher sub-system may transmit a new group and executable instructions to the testing client to perform tests on links of this new group. This may enable the testing client to automatically test each connection within the network as specified in the cutsheet or in the selected network topology and identify any issues present within the network for the network devices.

Figure 8:
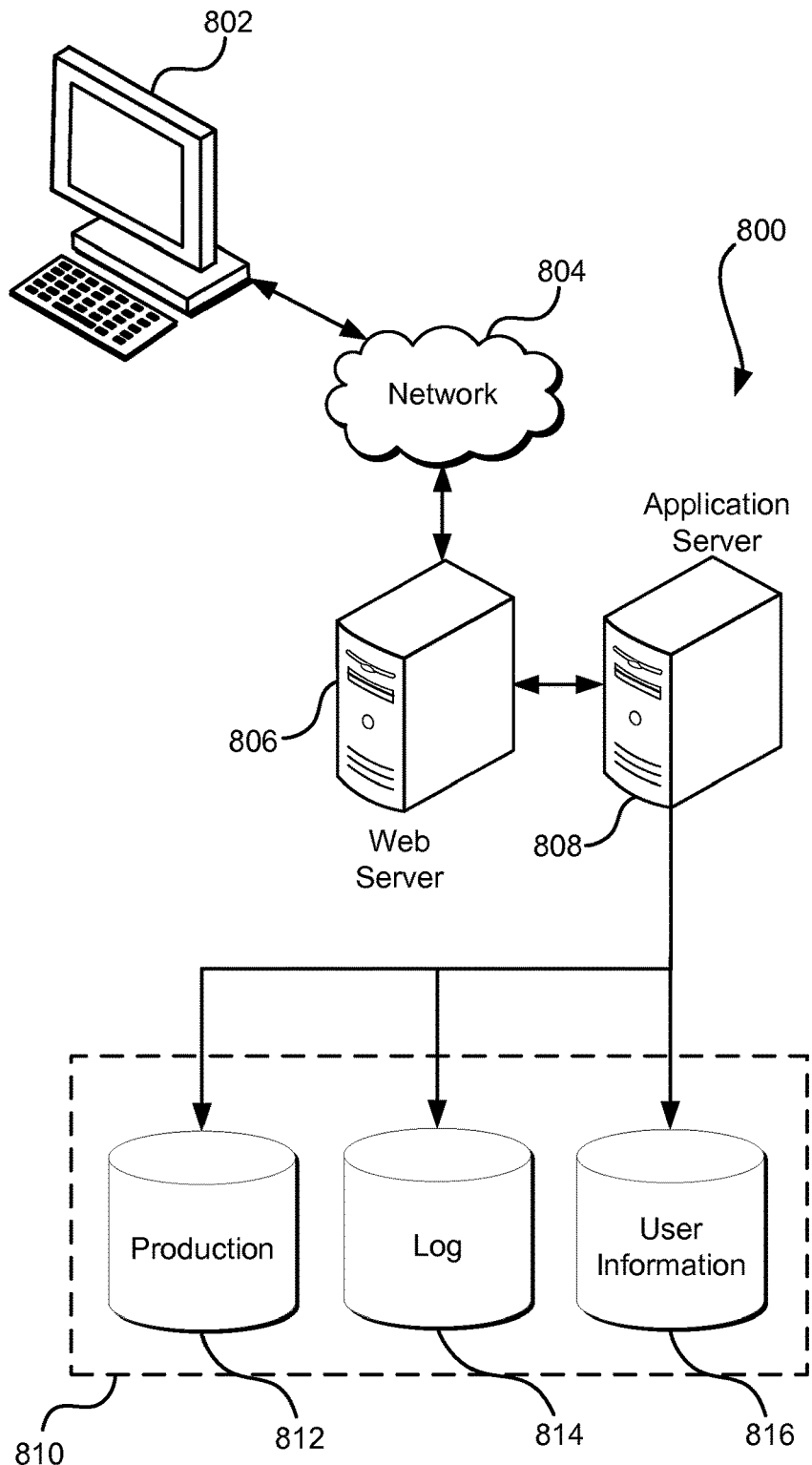
FIG. 8 shows an illustrative example of an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, from a user client device associated with a computing resource service provider, a request to perform one or more tests on network connections for a network topology, the request specifying the network connections for the network topology and network devices associated with the network topology;
   determining, based at least in part on an amount of symmetry between the network connections for the network topology, a network topology type;
   selecting, based at least in part on the network topology type, an algorithm to organize the network connections for the network topology into a plurality of groups, the plurality of groups specifying a subset of the network connections for the network topology;
   performing one or more interface tests on the network devices of individual groups of the plurality of groups to determine whether interfaces for the network devices are operational;
   determining, for the network devices of the individual groups, whether the network devices are physically connected to other network devices as specified within the individual groups;
   generating a report specifying results of the one or more interface tests and the determination of whether the network devices are physically connected to the other network devices as specified within the individual groups; and
   providing the report to the user client device.

2. The computer-implemented method of claim 1, wherein the algorithm is subject to one or more constraints in creation of the plurality of groups such that the individual groups observe a limit of concurrent connections to the network devices.

3. The computer-implemented method of claim 1, further comprising:
   evaluating, for individual network devices of the individual groups, a signal strength of a light signal transmitted from the individual network devices and a signal strength of a light signal being received by the individual network devices; and
   updating the report to specify results of the evaluation.

4. The computer-implemented method of claim 1, wherein the algorithm is a greedy mark and select algorithm configured to apply a set cover problem to the network topology if the network topology type corresponds to an arbitrary network topology.

5. A system, comprising at least one computing device configured to implement one or more services, wherein the one or more services are configured to:
   receive a request to evaluate network connections of a network topology;
   determine, for the network topology and based at least in part on an amount of symmetry between the network connections, a network topology type;
   select, from a plurality of algorithms corresponding to different network topology types, an algorithm that corresponds to the network topology type to organize the network connections into a plurality of groups;
   perform, for individual groups of the plurality of groups, one or more tests on the network devices associated with network connections specified within the individual groups, the one or more tests comprising interface tests;
   determine, for the network devices of the individual groups, whether the network devices are physically connected as specified within the individual groups; and
   update a report to specify results of the one or more tests and the determination.

6. The system of claim 5, wherein the one or more services are further configured to transmit the report to a database system to compile the report with historical data for the network topology.

7. The system of claim 5, wherein the one or more tests are non-destructive tests whereby performance of the one or more tests does not result in disruption of the network connections of the network topology.

8. The system of claim 5, wherein the one or more services are further configured to, as a result of the network topology type corresponding to an arbitrary network topology, use a greedy mark and select algorithm configured to apply a set cover problem to the network topology to organize the network connections into the plurality of groups.

9. The system of claim 5, wherein the plurality of groups are generated in a manner that observes a constraint on a number of concurrent network connections that can be made to the network devices associated with the network connections specified in the individual groups.

10. The system of claim 5, wherein the one or more services are further configured to update a user interface to provide the report to a user client device utilizing the one or more services to evaluate the network connections.

11. The system of claim 5, wherein the one or more services are further configured to, as a result of the results of the one or more tests indicating one or more errors associated with at least one network device of the network devices, terminating performance of additional tests on the at least one network device.

12. The system of claim 5, wherein the one or more tests cause the network devices to:
    determine whether any interfaces of the network devices are offline; and
    based at least in part on the determination, activate offline interfaces of the network devices to enable communication among the network devices to support additional tests.

13. A non-transitory computer-readable storage medium having stored thereon executable instructions that, if executed by one or more processors of a computer system, cause the computer system to at least:
    receive, from a user client device, a request to validate a plurality of network connections of a network topology;
    determine, based at least in part on an amount of symmetry between the plurality of network connections, a network topology type;
    select, based at least in part on the network topology type, an algorithm to organize the plurality of network connections into a plurality of groups;
    utilize the algorithm to organize the plurality of network connections into the plurality of groups;
    perform, for individual groups of the plurality of groups, one or more tests on the network devices associated with the plurality of network connections, the one or more tests performed in a manner that does not cause disruption to the plurality of network connections, the one or more tests comprising interface tests;
    determine, for the network devices of the individual groups, whether the network devices are physically connected as specified within the individual groups; and
    provide a report specifying results of the one or more tests and the determination.

14. The non-transitory computer-readable storage medium of claim 13, wherein the one or more tests cause the network devices to activate one or more offline interfaces of the network devices to enable communication among the network devices to support additional tests.

15. The non-transitory computer-readable storage medium of claim 13, wherein the executable instructions further cause the computer system to transmit instructions to the network devices to perform additional tests as a result of determining that a subset of the one or more tests was passed.

16. The non-transitory computer-readable storage medium of claim 13, wherein the selected algorithm is configured such that organization of the plurality of network connections into the plurality of groups is performed in a manner that observes a constraint on a number of concurrent network connections that can be made to the network devices for the individual groups.

17. The non-transitory computer-readable storage medium of claim 13, wherein the executable instructions further cause the computer system to:
    update a report to specify results of the one or more tests; and
    store the report within a database system comprising historical data for the network topology.

18. The non-transitory computer-readable storage medium of claim 13, wherein the executable instructions further cause the computer system to:
    select, as a result of the network topology type corresponding to an arbitrary network topology, a greedy mark and select algorithm configured to apply a set cover problem to the network topology; and
    utilize the greedy mark and select algorithm to organize the plurality of network connections into the plurality of groups.

19. The non-transitory computer-readable storage medium of claim 13, wherein the executable instructions further cause the computer system to transmit results of the one or more tests to a user client device.

20. The non-transitory computer-readable storage medium of claim 13, wherein the executable instructions further cause the computer system to:
    evaluate results of the one or more tests to identify any errors associated with at least one network device of the network devices; and
    as a result of identifying at least one error associated with the at least one network device, terminate performance of additional tests on the at least one network device.

* * * * *